May 23, 1961 M. J. SIMMONS ET AL 2,985,256

GREASE CUP

Filed Oct. 2, 1957

*INVENTOR.*
MALCOLM J. SIMMONS
JOSEPH E. HAUSER

BY *Wm. T. Wofford*

ATTORNEY

United States Patent Office 2,985,256
Patented May 23, 1961

2,985,256
GREASE CUP
Malcolm J. Simmons, Fort Worth, Tex., and Joseph E. Hauser, 1316 Bluebonnet Drive, Fort Worth, Tex.; said Simmons assignor, by mesne assignments, to Joseph E. Hauser Filed Oct. 2, 1957, Ser. No. 687,724

2 Claims. (Cl. 184—65)

Our invention relates to grease cups, and more particularly to grease cups of a type wherein grease is fed automatically from a reservoir at a selected rate to a part to be lubricated.

A general object of our invention is to provide an improved grease cup of the type abovementioned.

More specifically, it is an object of our invention to provide an improved grease cup which will prevent rupture of bearing seals due to excessive grease reservoir pressure.

Another object of our invention is to provide an improved grease cup wherein the reservoir grease level is readily visible.

Another object of our invention is to provide an improved grease cup incorporating effective means for controlling the rate of flow of grease from the reservoir.

Another object of our invention is to provide a grease cup of simple, attractive, and relatively economical structure.

These and other objects are effected by our invention as will be apparent from the following description taken in accordance with the accompanying drawings, forming a part of this application in which.

Figure 1:
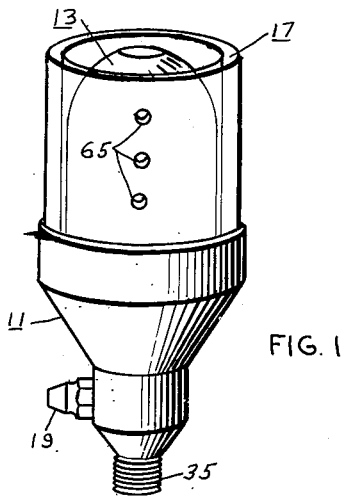
Fig. 1 is a schematic perspective view showing the grease cup of our invention as it would appear with the reservoir loaded with grease.
Figure 2:
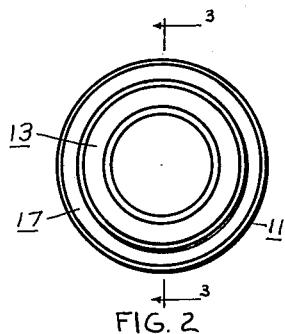
Fig. 2 is a plan view of the grease cup of Fig. 1, with the grease reservoir empty.
Figure 3:
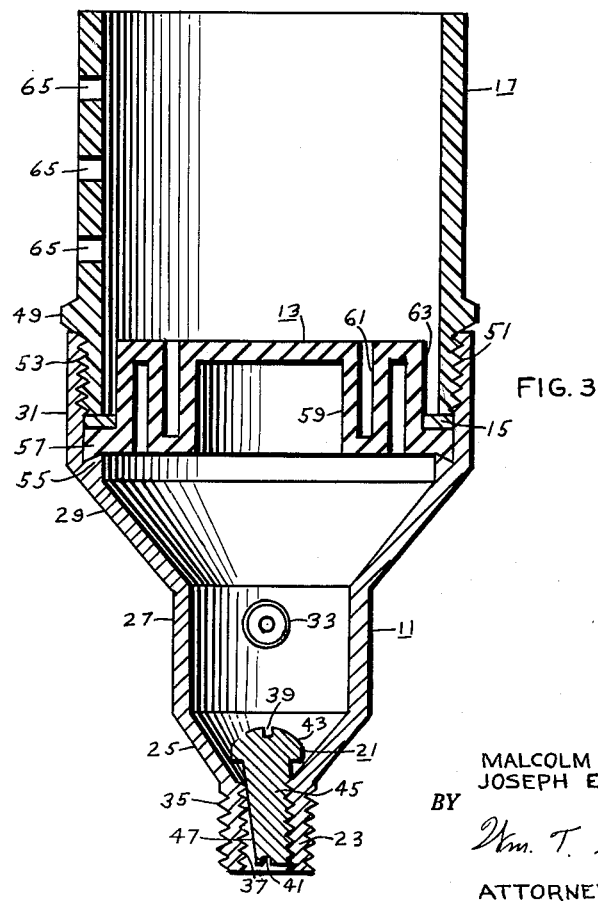
Fig. 3 is an enlarged section view taken on lines 3—3 of Fig. 2.

The grease cup shown in the drawings comprises a metal housing 11, a diaphragm 13, a retainer ring 15, a translucent cylinder 17, a grease fitting 19, and a flow rate control screw 21. The metal housing is made up of a first short cylindrical section 23, a first frustro-conical section 25 integral at its small end with said first cylindrical section, a second short cylindrical section 27 integral at one end with the large end of said first frustro-conical section 25, a second frustro-conical section 29 integral at its small end with the free end of said second cylindrical section 27, and a third short cylindrical section 31 integral at one end with the large end of said second frustro-conical section 29. All of said sections are co-axial. The second cylindrical section 27 has a threaded opening 33 in its side which is adapted for receiving the grease fitting 19. The grease fitting 19 is of a conventional type, such as an alemite fitting, which will allow passage of grease under pressure into the reservoir, but will not allow it to escape. The first cylindrical section 23 is threaded on both its outside surface and its inside surface. The outside threads 35 are adapted for co-operation with threads carried by the part (not shown) on which the grease cup is to be mounted. The inside threads 37 are adapted for receiving the grease flow rate control screw 21. The grease flow rate control screw 21 has a tool slot 39, 41 at each end thereof. The control screw has a head 43 and a threaded body 45. The lower outer edge of the head 43 mates with the inner surface of the first frustro-conical section 25 to completely close the cup exit when the screw 21 is sufficiently advanced into the first cylindrical section 23. The screw body 45 carries a flat 47 on one side, which tapers slightly inwardly from the upper to the lower end of the body 45. The translucent cylinder 17 is preferably made of plastic material, and carries a peripheral shoulder 49 on its outer surface near the cylinder lower end. The cylinder 17 carries threads 51 on its outer surface which threads extend from the shoulder 49 to the cylinder lower end. The third cylindrical section carries threads 53 on its inner surface which threads are adapted for co-operation with the threads 51 on the translucent cylinder 17. The second frustro-conical section 29 is provided with an integral projection 55 at the upper end of its inner periphery. The inner surface of said projection 55 is substantially parallel to the grease cup central axis and extends upwardly from the inner surface of the second frustro-conical section 29 to a level just above the lower extent of the third cylindrical section 31. The projection upper surface extends downwardly and outwardly from the top of said inner surface to merge with the inner surface of said third cylindrical section 31 thus, the projection 55 forms a seat for the flange 57 of said diaphragm, which flange is shaped to conform with the contour of said seat. Said diaphragm 13 is made of tough resilient grease resistant material, for example, neoprene rubber, in the form of a corrugated distendible element having concentric ribs and grooves. In the form shown in the drawings, the diaphragm comprises an inner cylinder 59 closed at its upper end, a concentric intermediate cylinder 61 bridged at its lower end to the lower end of said inner cylinder, and a concentric cylinder 63 bridged at its upper end to the upper end of said intermediate cylinder 61, and a flange 57 extending outwardly from the lower end of said outer cylinder 63. The retainer ring 15, which is preferably made of metal, is adapted to be slipped down over said outer cylinder 63 and rest on said flange 57. The translucent cylinder 17 is provided with a plurality of vertically aligned holes 65 in its wall which serve as rough grease level indicator marks and also as means for draining moisture from the cylinder 17. In some applications, for example where the grease cup is to be used in an atmosphere laden with foreign matter, it may be desirable to close the upper end of the translucent cylinder with a hinged or expansible cap.

In assembly, the grease flow rate control screw 21 is first threaded into the first cylindrical section 23 of the housing 11, then the diaphragm 13 is inserted in the housing with its flange 57 seated on the housing projection 55, then the retainer ring 15 is slipped down over the diaphragm outer cylinder 63 to rest on the flange 57, then the translucent cylinder 17 is threaded onto the housing with its lower edge bearing on the retainer ring 15 so as to hold the diaphragm flange 57 securely in place. The grease fitting 19 is of course threaded into the housing body.

In operation, before initial mounting of the grease cup onto the part to be lubricated, using the lower tool slot 41, the control screw 21 is turned to the grease cut-off position. The grease cup is then loaded with grease from a gun under pressure via the grease fitting 19. As the cup is loaded, the diaphragm 13 unfolds and expands until finally it reaches approximately the position indicated in Fig. 1. After loading, the grease in the cup is under pressure exerted by resilient diaphragm 13. Now the control screw 21 is backed off to allow the grease to flow out of the cup via the first cylindrical section 23. The rate of flow is controlled by the control screw position, increasing as the lower end of the control screw is advanced upward into the first cylindrical section 23 causing the flat to retreat from the first cylindrical section side wall. When the grease flow rate has been adjusted to suit the application, the cup is mounted onto the part to be lubricated by threading the first cylindrical section 23 into the co-operating receptacle of the said part. Thereafter, the cup reservoir is simply re-loaded as required. In cases where the grease cup is to be used to lubricate a sealed bearing, the flow rate control screw is not used.

It will be apparent from the foregoing that we have provided a grease cup which is quite simple in structure, devoid of complex mechanisms, and yet very effective in operation. The level of grease in the cup may be ascertained at a glance. It is an important advantage that the diaphragm may expand freely, and if excessive grease pressure is introduced in the reservoir, the diaphragm will rupture before the bearing seal does, thus affording important protection to bearing seals. Replacement of a ruptured diaphragm takes only a few seconds.

While we have shown our invention in only one form, it will be obvious to those skilled in the art that it is not so limited, but is susceptible to various changes and modifications without departing from the spirit thereof.

We claim:

1. A lubricating device for automatically feeding lubricant from a reservoir to a bearing or the like, comprising a hollow housing of tapered-cylindrical shape having a one-way lubricant injection fitting positioned in a wall thereof and means for attaching said housing to a bearing to be lubricated, said attaching means defining an axial lubricant-discharge passageway communicating with the interior of said housing, said housing including an axial cylindrical internally threaded wall merging inwardly into an annular sealing shoulder, a distendible elastic diaphragm element formed of non-metallic lubricant-resistant material terminating in a peripheral sealing flange seated on said shoulder, and a rigid cylindrical light-transmitting open-ended guard element threadedly engaged with said threaded wall of the housing and sized to press said flange into sealed engagement with said shoulder; said guard element extending outwardly from said housing a distance sufficient to laterally enclose and protect said diaphragm element even when the latter is fully distended under the pressure of contained lubricant.

2. A lubricating device in accordance with claim 1, in which said diaphragm element in its relaxed condition comprises a concentric series of serpentine corrugations to permit its axial distention to a substantially cylindrical shape under the pressure of contained lubricant.

References Cited in the file of this patent

UNITED STATES PATENTS

| | | |
|---|---|---|
| 425,484 | Benners | Apr. 15, 1890 |
| 670,516 | Power | Mar. 26, 1901 |
| 1,160,593 | Graham | Nov. 16, 1915 |
| 1,616,425 | Fink | Feb. 1, 1927 |
| 1,640,407 | Herbst | Aug. 30, 1927 |
| 2,352,680 | Armitage | July 4, 1944 |
| 2,478,639 | Reed | Aug. 9, 1949 |
| 2,506,035 | Parker | May 2, 1950 |
| 2,852,098 | Benson | Sept. 16, 1958 |
| 2,857,020 | Otto | Oct. 21, 1958 |